United States Patent
Corrigan et al.

(10) Patent No.: US 12,165,137 B1
(45) Date of Patent: Dec. 10, 2024

(54) SOCIAL FOREIGN CURRENCY EXCHANGE

(71) Applicant: Wells Fargo Bank, N.A., San Francisco, CA (US)

(72) Inventors: Sean Corrigan, New York, NY (US); Stephen Godfrey, Palo Alto, CA (US); Michael P. Skelley, San Rafael, CA (US); Sridhar Uppaluri, Minneapolis, MN (US); Jeannette Woodbury, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 138 days.

(21) Appl. No.: 17/390,406

(22) Filed: Jul. 30, 2021

Related U.S. Application Data

(63) Continuation of application No. 15/380,945, filed on Dec. 15, 2016, now Pat. No. 11,080,688.

(60) Provisional application No. 62/271,779, filed on Dec. 28, 2015.

(51) Int. Cl.
*G06Q 20/38* (2012.01)
*G06Q 20/10* (2012.01)
*G06Q 20/40* (2012.01)

(52) U.S. Cl.
CPC ........ *G06Q 20/381* (2013.01); *G06Q 20/1085* (2013.01); *G06Q 20/405* (2013.01)

(58) Field of Classification Search
CPC .................. G06Q 20/1085; G06Q 20/381
See application file for complete search history.

(56) References Cited

U.S. PATENT DOCUMENTS

| | | | |
|---|---|---|---|
| 8,494,956 B2 * | 7/2013 | Tulluri | G07F 19/20 705/40 |
| 8,818,868 B2 | 8/2014 | Faires et al. | |
| 2009/0248574 A1* | 10/2009 | Leung | G06Q 20/10 705/39 |
| 2011/0196797 A1* | 8/2011 | Liwerant | G06Q 20/065 705/71 |
| 2012/0259772 A1 | 10/2012 | Lee | |
| 2013/0024359 A1 | 1/2013 | Wright | |
| 2014/0358760 A1 | 12/2014 | Heskett-Paoloni | |

(Continued)

OTHER PUBLICATIONS

De Waal-Montgomery, M., Does free social currency exchange sound too good to be true?, E27, Feb. 10, 2015, retrieved from the Internet at https://e27.co/does-free-social-currency-exchange-sound-too-good-to-be-true-20150210/, 6 pages.

(Continued)

*Primary Examiner* — Hao Fu
(74) *Attorney, Agent, or Firm* — Foley & Lardner LLP

(57) ABSTRACT

A currency exchange platform for conducting currency exchanges and transactions in a social pool is described. The currency exchange platform receives a request for an amount of a first currency from a first user in a social pool. The request includes an indication of a type of the request and a preference for delivery of the funds. The currency exchange platform then matches the request with a matching account in the social pool, and, responsive to the preference for delivery indicating an automated teller machine (ATM) for delivery of the funds, delivers at least a portion of the requested amount of the first currency to the first user via the ATM.

12 Claims, 5 Drawing Sheets

(56) References Cited

U.S. PATENT DOCUMENTS

| | | | |
|---|---|---|---|
| 2015/0026031 A1* | 1/2015 | Mullin, III | G06Q 40/04 |
| | | | 705/37 |
| 2015/0278949 A1 | 10/2015 | Don et al. | |
| 2015/0310569 A1 | 10/2015 | Chong et al. | |
| 2016/0012465 A1 | 1/2016 | Sharp | |
| 2017/0098216 A1* | 4/2017 | Studnitzer | G06Q 40/02 |

OTHER PUBLICATIONS

Hinrikus et al., Transfer Money Online-Send Money Abroad with TransferWise, TransferWise, Ltd., 2015, 3 pages.

Jesner et al., WeSwap Social Currency-Learn More, WeSwap.com, 2015, 4 pages.

Meyers, B., CurrencyFair Online P2P International Money Transfers-Send Money Abroad, www.currencyfair.com, CurrencyFair LTD. 2010, 5 pages.

Zaleski, Andrew, "A start-up that wants to make ATMs obsolete", CNBC, Nov. 7, 2014. https://www.cnbc.com/2014/11/07/a-start-up-that-wants-to-make-atms-obsolete.html 10 pages.

* cited by examiner

Account Statement

John Doe
Acct #: xx-xxxx-1234

| Date | Description | Currency In | Currency Out | Balance ||
|---|---|---|---|---|---|
| | | | | USD | EUR |
| 05/10/2015 | Transfer | USD 500.00 | | 500.00 | 0.00 |
| 05/12/2015 | Exchange | EUR 400.00 | USD 480.00 | 20.00 | 400.00 |
| 05/12/2015 | Transfer | | EUR 400.00 | 20.00 | 0.00 |
| 05/14/2015 | Gift | EUR 100.00 | | 20.00 | 100.00 |
| 05/14/2015 | Borrow | EUR 200.00 | | 20.00 | 300.00 |
| 05/14/2015 | Transfer | | EUR 300.00 | 20.00 | 0.00 |

FIG. 4

Account Statement

John Doe
Acct #: xx-xxxx-1234

| Date | Description | Currency In | Currency Out | Balance ||
|---|---|---|---|---|---|
| | | | | USD | EUR |
| 05/14/2015 | Transfer | | EUR 300.00 | 20.00 | 0.00 |
| 06/01/2015 | Transfer | USD 500.00 | | 520.00 | 0.00 |
| 06/01/2015 | Pay Back | | USD 240.00 | 280.00 | 0.00 |
| 06/15/2015 | Gift | | USD 100.00 | 180.00 | 0.00 |

FIG. 5

SOCIAL FOREIGN CURRENCY EXCHANGE

CROSS-REFERENCE TO RELATED APPLICATIONS

This application is a Continuation of U.S. patent application Ser. No. 15/380,945 entitled "SOCIAL FOREIGN CURRENCY EXCHANGE," filed Dec. 15, 2016, which itself claims priority to U.S. Provisional Patent Application No. 62/271,779 entitled "SOCIAL FOREIGN CURRENCY EXCHANGE," filed Dec. 28, 2015, each of which is incorporated herein by reference in its entirety and for all purposes.

TECHNICAL FIELD

The present disclosure relates generally to the field of currency exchanges and transfers within a social pool.

BACKGROUND

People typically conduct the majority of their transactions in their home currency. For example, residents of the United States typically conduct transactions in U.S. Dollars ("USD"). When people travel, it can be inconvenient to exchange their home currency for a foreign currency. People looking to exchange funds typically have to interact with foreign exchange dealers or other financial institutions to execute the foreign exchange transaction. Further, many existing mechanisms for foreign exchange are expensive because foreign exchange dealers and financial institutions may charge a foreign exchange spread to make money on the transaction. For example, if a first person wants to exchange USD for Euros, a foreign exchange dealer may charge the person 1.25 USD for every purchased Euro. If as second person wants to exchange Euros for USD, that same foreign exchange dealer may only provide 1.10 USD in exchange for each provided Euro. The difference of 0.15 USD is the foreign exchange spread, which is collected by the foreign exchange dealer. More convenient and less expensive foreign currency exchange mechanisms are desirable.

SUMMARY

One example embodiment relates to a method of conducting currency exchange and transactions within a social pool. The method includes setting up, by a currency exchange platform, exchange funds in a plurality of exchange accounts associated with a plurality of users of the social pool. The plurality of users are associated with each other through a social network. The method also includes receiving, by the currency exchange platform, a request for an amount of a first currency from a first user in the social pool, and matching, by the currency exchange platform, the request with a matching account of the plurality of exchange accounts in the social pool. The matching account includes the first currency. The method further includes delivering, by the currency exchange platform, at least a portion of the requested amount of the first currency to the first user.

Another example embodiment relates to a currency exchange platform. The exchange platform includes an exchange account database having a plurality of exchange accounts associated with a plurality users of a social pool. The plurality of users are associated with each other through a social network. The exchange platform also includes a network interface configured to communicate data to and from at least one of a financial institution computing system, the social network, a user device associated with a user, and an ATM system over a network, memory, and a processor. The processor is structured to set up exchange funds in the plurality of accounts associated with the plurality of users, receive a request for an amount of a first currency from a first user in the social pool, and match the request with a matching account of the plurality of accounts in the social pool. The matching account includes the first currency. The processor is further structured to deliver at least a portion of the requested amount of the first currency to the first user.

A further example embodiment relates to a non-transitory computer-readable media having computer-executable instructions embodied therein, when executed by a processor of a social foreign currency exchange platform, cause the social foreign currency exchange platform to perform a process. The process includes setting up exchange funds in a plurality of exchange accounts associated with a plurality of users of a social pool. The plurality of users are associated with each other through a social network. The process also includes receiving a request for an amount of a first currency from a first user in the social pool, and matching the request with a matching account of the plurality of exchange accounts in the social pool. The matching account includes the first currency. The process further includes delivering at least a portion of the requested amount of the first currency to the first user.

These and other features, together with the organization and manner of operation thereof, will become apparent from the following detailed description when taken in conjunction with the accompanying drawings, wherein like elements have like numerals throughout the several drawings described below.

BRIEF DESCRIPTION OF THE FIGURES

FIG. 4 is a schematic diagram of an account statement associated with transactions within a social pool according to an example embodiment.

FIG. 5 is a schematic diagram of an account statement associated with transactions within a social pool according to another example embodiment.

DETAILED DESCRIPTION

Figure 1:
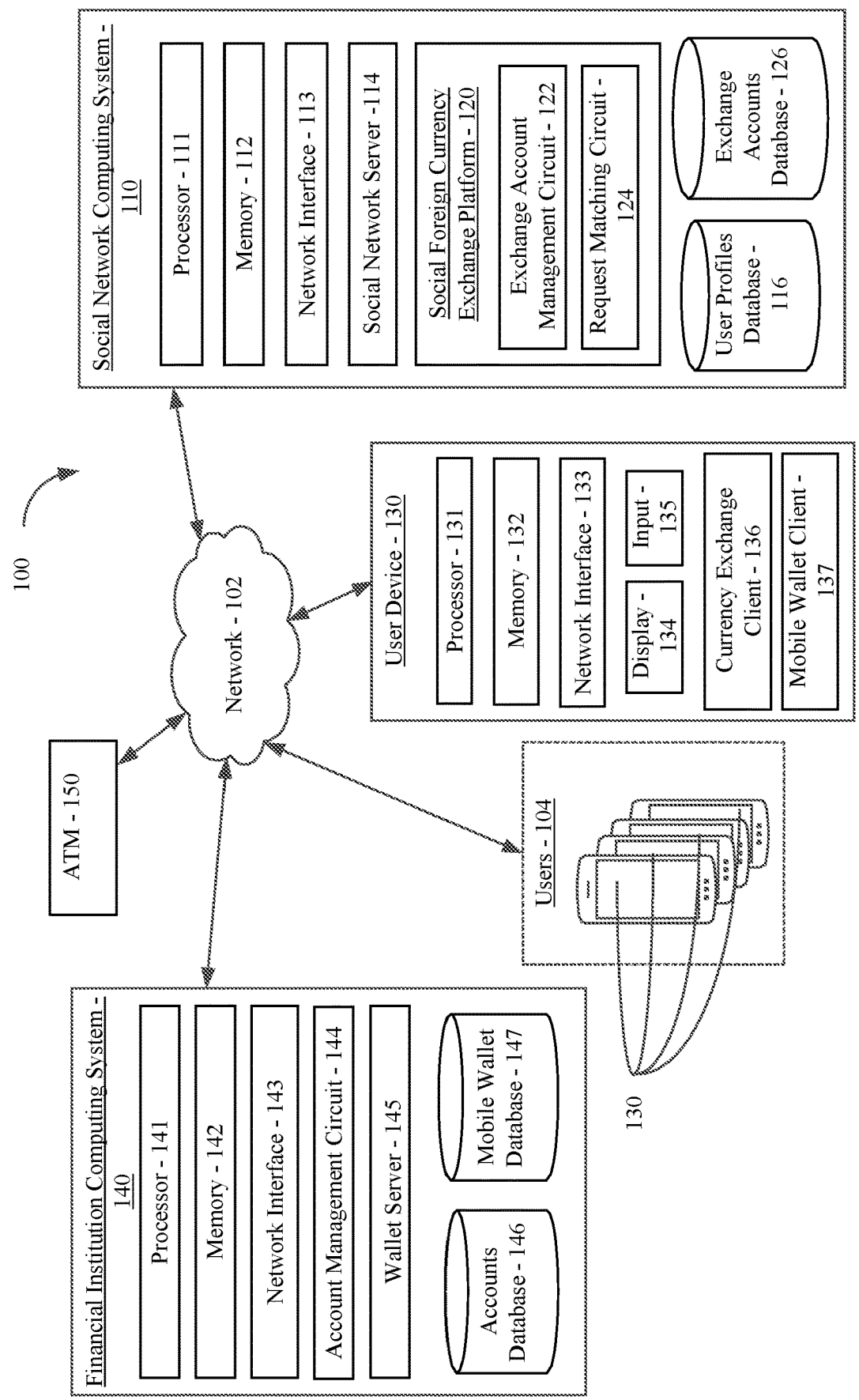
FIG. 1 is a block diagram of a computing environment for currency exchanges and transactions within a social pool according to an example embodiment.

Before turning to the figures which illustrate example embodiments, it should be understood that the application is not limited to the details or methodology set forth in the following description or illustrated in the figures. It should also be understood that the phraseology and terminology employed herein is for the purpose of description only and should not be regarded as limiting.

Foreign exchange spread is incurred when people exchange currencies with a dealer. As used herein, the foreign exchange spread refers to a bid-ask type spread which is the difference between the price at which a dealer will buy a currency and the price at which the dealer will sell a currency. For example, if a first person wants to exchange USD for Euros, a foreign exchange dealer may charge the person 1.25 USD for every purchased Euro. If as second person wants to exchange Euros for USD, that same foreign exchange dealer may only provide 1.10 USD in exchange for each provided Euro. The difference of 0.15 USD is the foreign exchange spread, which is collected by the foreign exchange dealer.

The present disclosure relates to a social foreign currency exchange platform that can avoid the foreign exchange spread by conducting the currency exchange within a social pool. A social pool refers to entities, such as people or organization, associated with each other through a social network. A social network refers to a computer network connecting entities by a set of social associations, professional associations, and/or other relationships that link members of the social network. Examples of social networks include Facebook®, LinkedIn®, Twitter®, etc. A participant seeking an amount of a first currency leverages the social pool to obtain the desired amount of the first currency. As described in further detail below, the individual may trade for the first currency with an amount of a second currency, request a loan in the first currency to be paid back in the future, or request a gift of the first currency. The participant can decide whom in social pool to deal with for the purpose of currency exchanges and transactions, for example, a trusted group comprising, Facebook® friends, friends of friends, people with similar interests or financial standing, mutual relationship, etc. Participants of the pool contribute their on hand currencies into the exchange platform and can set rules on how the contributed money is to be distributed to other pool participants. When a participant requests funds in a desired currency, the platform looks for other pool participants who have funds available in the desired currency and can pool funds from various pool participants who have the desired currency to meet the request. The platform or the participant can set the exchange rate between the ongoing bid and ask prices (e.g., mid-price) for the exchange thereby avoiding the bid-ask spread. The requested funds in the desired currency can be made available to the requester via a mobile wallet and/or at an automated teller machine (ATM).

Referring generally to the figures, systems and methods for conducting currency exchanges and transactions within a social pool are described. In particular, a social foreign currency exchange platform sets up funds for exchange in the social pool. Participants of the social pool contribute an amount of on hand currency to the exchange funds. The contributed money can be held and managed by the platform or alternatively, be held in a participant's financial institution in a segregated or escrowed sub-account. In the latter case, the exchange platform can access the participant's account with the financial institution subject to rules specified by the participant, or for designated situations, or with enough notice. The exchange platform receives a request for funds in a first currency from a participant, in which the participant can request a gift in the first currency, a loan in the first currency, or an exchange of a second currency for the first currency. The exchange platform matches the request with funds in the social pool by looking for other pool participants who have funds available in the first currency. The platform can pool funds from various pool participants to meet the request. The platform can facilitate the exchange by matching social pools and/or processing the pooled transaction in a dark pool format. The platform can then deliver at least a portion of the requested amount of foreign currency to the requester via a mobile wallet and/or at an ATM.

Referring to FIG. 1, a diagram of a computing environment 100 is shown according to an example embodiment. In the computing environment 100, the social foreign currency exchange platform 120 conducts currency exchanges and/or transactions for users 104 (e.g., via user devices 130) of a social network hosted by a social network server 114, with the facilitation of a financial institution (e.g., via a financial institution computing system 140) and an ATM system (e.g., via an ATM 150). In some arrangements, the social network computing system 110 hosts both the social networking server 114 and the social foreign currency exchange platform 120. In other arrangements, the social foreign currency exchange platform 120 is not integrated to the social networking computing system 110. In this case, the exchange platform 120 can be a separate computing system hosting an application that uses various application programming interfaces (API) provided by the social network server 114 to access services and resources from the social network computing system 110 in order to conduct the exchange and transaction functions for the users 104. In some arrangements, the exchange platform 120 is hosted by a third-party (e.g., the financial institution computing system 140) and operates across multiple social networks (e.g., Facebook® and LinkedIn®). The social network computing system 110 includes a processor 111, memory 112, and a network interface 113. Memory 112 stores various program instructions that, when executed by the processor 111, control the operation of the social network computing system 110. The network interface 113 allows the social network computing system 110 to send and receive data to and from external devices and entities via a network 102.

The social network server 114 on the social network computing system 110 allows users 104 to interact with and participate in a social network (e.g., through the user devices 130). As used herein, a social network refers to a computer network connecting entities, such as people or organizations, by a set of social associations, professional associations, and/or other relationships that link members of the social network. Examples of social networks include Facebook®, LinkedIn®, Twitter®, etc. A social pool refers to people associated with each other through the social network. Associations between users 104 can be one or more of a variety of types, such as friend, co-worker, family member, business associate, common-interest association, common-geography association, and so on. Associations can also include intermediary relationships, such as friends of a friend, and degree of separation relationships, such as three degrees away. Associations between users 104 can be mutual relationships. For example, a first user ("A") can invite a second user ("B") to become associated with user A and user B can accept or reject the invitation. A user can further categorize or weigh the associations with other users by assigning a level to the associations. For example, for a friendship-type association, the user can assign a level, such as acquaintance, friend, good friend, and best friend, to the associations between the user and other users. In some arrangements, the social network server 114 allows a user to create and/or join a group that is organized around a common cause, issue, or activity, for example, a group of people living in the same town who like to travel.

Users 104 can share their interests and activities and/or explore the interests and activities of others users via the social network computing system 110. An individual or an organization that is a user of the social network has a profile that represents the user in the social network. Each profile contains entries. Examples of entries for a person profile include information regarding birth date, age, relationship status, children, ethnicity, religion, habits, locations, activities, favorite books, movies, cuisines, phone number, address, career, or any other information describing, identifying, or otherwise associated with a profile. Examples of entries for a business profile include information regarding market sector, customer base, location, supplier information, stock performance, or other types of information associated with the business. In addition, entries can include information regarding associations with other users, for example, friendships, business relationships, acquaintances, community associations, activity partner associations, common interest associations, common characteristic associations, or any other suitable type of associations between users. The social network server 114 includes program logic executable by the processor 111 to implement at least some or all of the functions described herein.

The social foreign currency exchange platform 120 facilitates currency exchanges and transactions for the users 104 using their associations in the social network. As discussed above, in some arrangements, the exchange platform 120 is integrated into the social network computing system 110. In other arrangements, the exchange platform 120 is separate but can access services and resources from the social network computing system 110. In further arrangements, the exchange platform 120 is hosted by a third-party (e.g., the financial institution computing system 140) and operates across multiple social networks.

The exchange platform 120 facilitates currency exchanges and transactions within social pools of a social network. A user 104 can define whom in the social pool to deal with for the purpose of currency exchanges and transfers, for example, as a trusted group including Facebook® friends, friends of friends, people with similar interests or financial standing, mutual relationship, etc. Users 104 can contribute money in a given currency to their accounts with the exchange platform 120. The funds within the accounts held with the exchange platform 120 may be used to fund currency exchanges and transfers. The exchange platform 120 includes an exchange account management circuit 122 structured to manage the users' accounts with the exchange platform 120. When the exchange platform 120 receives a request for funds in a first currency from a user, a request matching circuit 124 matches the request with exchange funds in the social pool by looking for other pool participants who have funds available in the desired currency. If the request can be met or partially, the exchange platform 120 delivers the requested foreign currency to the requester via a mobile wallet provided by the financial institution computing system 140 and/or at an ATM 150 in the country of the requested currency. Operations of the exchange platform 120 will be discussed in more detail below with reference to FIG. 2.

The social network computing system 110 includes various database, for example, a user profiles database 116 and an exchange accounts database 126. The user profiles database 116 stores information relating to the user profiles on the social network, for example, users' entries, users' associations with other users, etc. The exchange accounts database 126 stores information relating to the exchange accounts with the exchange platform 120, for example, balance of accounts, transaction history, etc.

The financial institution computing system 140 facilitates the exchange platform 120 to conduct currency exchanges and transactions. In some arrangements, the financial institution operates the social foreign currency exchange platform 120. In some arrangements, the financial institution computing system 140 is associated with a financial institution (e.g., a bank, a credit card issuer, etc.). The financial institution computing system 140 includes a processor 141, memory 142, and a network interface 143. Memory 142 stores various program instructions that, when executed by the processor 141, control the operation of the financial institution computing system 140. The network interface 143 allows the financial institution computing system 140 to send and receive data to and from external devices and entities via the network 102. A user 104 has one or more financial accounts (e.g., check account, savings account, etc.) with the financial institution computing system 140 that can be used to fund the exchange account with the exchange platform 120 or can be accessed by the exchange platform 120 subject to rules specified by the user 104. An account management circuit 144 is structured to manage the user' account(s) with the financial institution computing system 140. In some arrangements, the financial institution computing system 140 hosts a wallet server 145 that provides a mobile wallet for the user 104. In other arrangements, the user 104 can use the mobile wallet provided by a different financial institution. As used herein, a digital wallet refers to a software application that servers as an electronic version of a physical wallet. The exchange platform 120 can deliver the requested foreign currency to the requester's digital wallet.

The financial institution computing system 140 includes various database, for example, an accounts database 146 and a mobile wallet database 147. The accounts database 146 stores information relating to users' accounts with the financial institution computing system 140, for example, balance and transaction history of the accounts. The mobile wallet database 147 stores information relating to users' digital wallet with the financial institution computing system 140, for example, identifiers of the user devices 130, wallet payment instruments (e.g., stored debit/credit card information, stored check account and savings account information, payment token), etc. The exchange platform 120 can deliver the requested foreign currency to any kind and/or any number of payment instruments associated with the digital wallet.

The requested amount of foreign currency can be delivered to an automated teller machine (ATM) 150 through an ATM system via the network 102. The ATM 150 may be affiliated with the financial institution operating the financial institution computing system 140. ATMs can perform transactions related to financial accounts, for example, withdrawal of money from a check or savings account. The user 104 enters the desired withdrawal amount and if the transaction is approved, receives the requested amount. The withdrawal amount is deducted from the user's financial account. ATMs may also be used for credit card transactions and credit card cash advances, money transfer, payments, etc. In some arrangements, a physical card (e.g., a prepaid debit card) associated with the user's financial account is used at the ATM 150. The card may be issued by an operator of the exchange platform 120, the financial institution operating the financial institution computing system 140, or another entity. The card stores information associated with the financial account, e.g., account numbers, transaction histories, personal identification numbers (PINs) and/or card verification values (CVVs), the type and amount of currencies held in the account, etc. With the card, the user 104 can retrieve currency at the ATM 150.

A user 104 can fund the exchange account, set exchange rules, request foreign currency, and/or use the foreign currency through the user device 130. The user device 130 may be smartphone, a portable media device, a personal digital assistant (PDA), a laptop computer, or a personal computer.

The user device 130 includes a processor 131, memory 132, and a network interface 133. Memory 132 stores various program instructions that, when executed by the processor 131, control the operation of the user device 130. The network interface 133 allows the user device 130 to send and receive data to and from external devices and entities via the network 102. The network interface 123 may be a wireless network interface that communicates with a wireless communication protocol (e.g., 802.11a/b/g/n, Bluetooth®, ZigBee®, CDMA, GSM, LTE, WiMax, etc.) or a wired communication protocol (e.g., Ethernet, USB, Thunderbolt®, etc.). The user device 130 includes a display 134 and an input 135. In some arrangements, the display 134 and input 135 are integrated in a touchscreen display.

The user device 130 hosts a currency exchange client 136 and a mobile wallet client 137. The currency exchange client 136 includes program logic executable by the processor 131 to cooperate with the exchange platform 120 to implement at least some or all currency exchange functions described herein. The currency exchange client 136 may be a web browser that is configured to receive and display web pages (e.g., web pages for the user to input requested amount and type of foreign currency, web pages displaying exchange account balance information, etc.) or an application executed by the user device 130. The currency exchange client 136 is configured to communicate with the exchange platform 120 via the network 102. The mobile wallet client 137 includes program logic executable by the processor 131 to cooperate with the wallet server 145 to implement the mobile wallet functions described herein. The mobile wallet client 137 may be a web browser that is configured to receive and display web pages (e.g., web pages displaying transaction information) or an application executed by the user device 130. The mobile wallet client 137 is structured to communicate with the wallet server 145 on the financial institution computing system 140 via the network 102.

The network 102 facilitates communication between the above-noted devices and entities. The network 102 may include private networks, public networks, or a combination thereof. In some arrangements, the network 102 includes the Internet.

Figure 2:
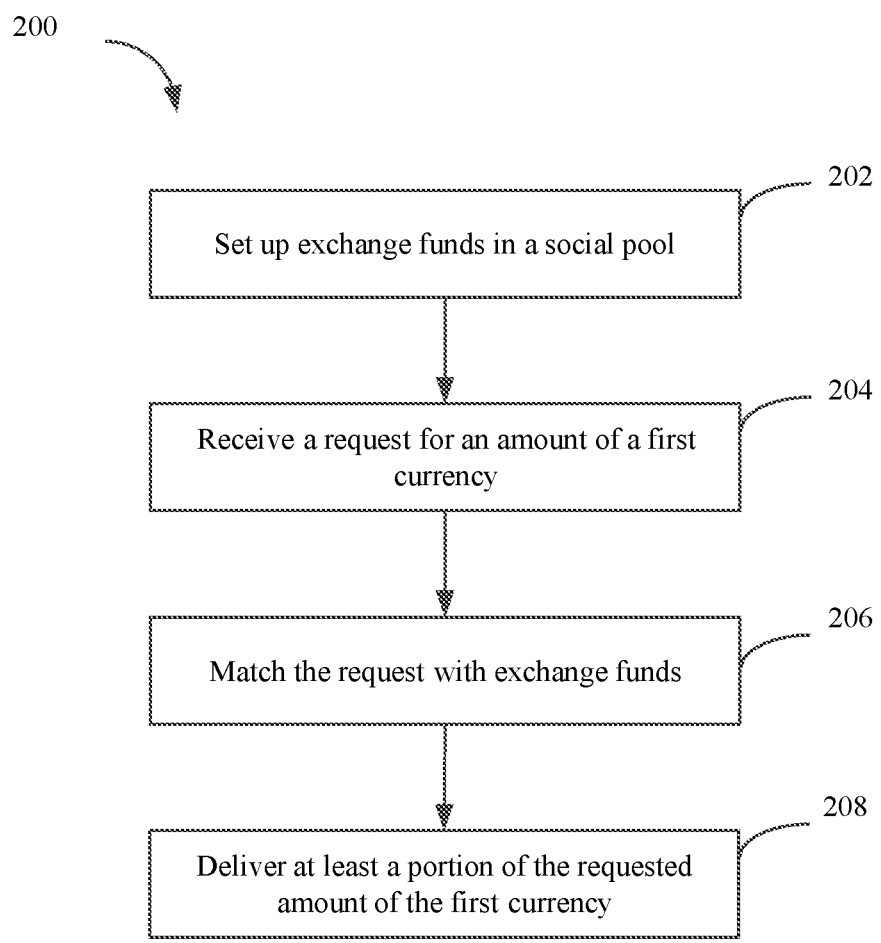
FIG. 2 is a flow diagram of a method of conducting currency exchanges and transactions within a social pool according to an example embodiment.

Referring to FIG. 2, a flow diagram of a method 200 of conducting foreign currency exchanges and transactions via a social pool is shown according to an example embodiment. In some arrangements in which the social foreign currency exchange platform 120 is on the social network computing system 110, the method 200 is performed by the social network computing system 110 (e.g., by the processor 111). In other arrangements in which the exchange platform 120 is on a separate computing system than the social network computing system 110, the method 200 is performed by the computing system hosting the exchange platform 120. For example, the method 200 may be performed by the financial institution computing system 140.

The method 200 begins when exchange funds are set up in a social pool at 202. The social pool includes users of the social network hosted by the social network server 114. In some arrangements, the social pool includes users across multiple social networks. In some arrangements, a user 104 defines whom in the social pool to deal with for the purpose of facilitating currency exchanges and transactions, for example, a trusted group of people comprising Facebook® friends, friends of friends, people with similar interests or financial standing, mutual relationship, etc. The user 104 can change the configuration as he/she sees fit. The exchange funds come from money contributed by participants to the pool. A user 104 who wants to participate the pool for currency exchange requests to register an exchange account with the exchange platform 120. The exchange platform 120 receives the request from the user device 130 during, for example, a secure session. The request may include the user identification information (e.g., a username) and the user's profile information on the social network with the social network server 114. In some arrangements, the information is input by the user via the input 135 on the user device 130. In other arrangements, the profile information is imported from the social network server 114 based on the use identification information. The profile information can include the user's associations with other users of the social network, an address, an e-mail address, a phone number, contact information of the user, etc.

The exchange platform 120 creates an exchange account for the user based on the information received with the request. Creating the exchange account includes generating a unique user account number or identification. In some arrangements, the same user account number/identification is used for the social network profile on the social network server 114 and the exchange account on the exchange platform 120. In other arrangements, the exchange platform 120 creates a different user account number/identification for the exchange account. In some arrangements, the user associates the exchange account with a mobile wallet (e.g., payment instruments stored in the mobile wallet) for the purpose of delivering requested foreign currency. Alternatively or additionally, the user associates the exchange account with a financial account that can be accessed at an ATM for the purpose of delivery.

When the exchange account is created, the user 104 can fund the account with on hand currency or currencies. The exchange account can be funded in any suitable way, for example, by cash, direct deposit, check, funds transfer, wire transfer, etc. The account can also be funded from a financial account of the user 104 with a financial institution, e.g., prepaid accounts, check accounts, savings accounts, money market accounts, etc. Money contributed by various users in different currencies forms the funds for exchange. In some arrangements, funds in the exchange account are held and managed by an operator of the exchange platform 120. In other arrangements, the money is held in the user's financial institution account (e.g., on the financial institution computing system 140) in a segregated or escrowed sub-account. The exchange platform 120 can access the segregated or escrowed sub-account and withdraw money therefrom subject to restrictions specified by the user 104, or for designated situations, or with enough notice. For example, the user 104 can provide that the exchange platform 120 is authorized to access up to $1,000 from the segregated/escrowed sub-account with the financial institution in any twelve month cycle. In some arrangements, the user 104 can specify that the exchange platform 120 is authorized to access a maximum of $25 for each request.

In some arrangements, the user 104 decides whom he/she wants to deal with in the social pool for currency exchanges and transactions. For example, the user can provide that he/she only deals with a trusted group, e.g., Facebook® friends, or first connections of friends (i.e., friends of friends), people with similar interests or financial standing, or mutual relationship (i.e., people who agree to deal with the user). In other arrangements, the user 104 lets the exchange platform 120 make the decision. In further arrangements, the user can change the configuration through a user interface provided by the currency exchange client 136 on the user device 130.

In some arrangements, a user 104 can provide which type(s) of foreign currency is allowed to exchange for funds in his/her exchange account. For example, the user 104 can provide that only USD, EUR, Japanese Yen, Chinese Yuan, are allowed to exchange for funds held in the exchange account. The user can select the allowed types of foreign currency through a user interface provided by the currency exchange client 136 on the user device 130.

In some arrangements, a user 104 sets rules on how funds in his/her exchange account can be distributed to other users in the social pool for currency exchange. In some arrangements, the exchange platform 120 allows a participant of the pool to request a gift in a first currency, a loan in the first currency, and an exchange of a second currency (e.g., a user-default currency) for the first currency. The requester can ask for a gift in a given currency without contributing funds to the exchange platform 120 (e.g., a gift from family and friends for an upcoming trip). The user can provide to whom the exchange platform 120 is authorized to make a gift from the exchange account and how much the gift can be. The user can set different rules for people of different associations. For example, the user provides that a gift up to $200 in any twelve month cycle can be made to a siblings, a gift up to $50 can be made to a cousin, no gift is made to acquaintances, and so on. In the case of request for a loan in a given currency, the requester might not have enough money in his/her exchange account to fund the requested amount of desired currency. A user can provide how much credit the exchange platform 120 is authorized to extend to the requester from the exchange account. The user can set different rules for people of different associations. For example, the user sets a credit line of $1,000 for a sibling, a credit line of $200 for a cousin, a credit line of $100 to a good friend, a maximum of $25 loan for each request, and so on. The requester should pay back in, for example, a month. In some arrangements, an agreement is reached regarding the interest rate between the requester and the provider. In the case of request for exchange (i.e., the requester has adequate funds in the exchange account for the requested amount of desired currency), the user can provide how much money is the exchange platform 120 authorized to exchange to the given currency from the exchange account. For example, the user can provide that up to $3,000 can be exchanged in any twelve month cycle, a maximum of $50 can be exchanged for each request, etc. The user can set and change the rules through a user interface provided by the currency exchange client 136 on the user device 130.

A request for an amount of a first currency is received at 204 by the exchange platform 120. The request may be received during a secure session between the user device 130 and the social network computing system 110 (or other computing system hosting the exchange platform 120) via the network 102. The request includes the requester's identification information, the requester's exchange account number or identification, and requested type and amount of foreign currency. The request can specify whether it is a gift request, a loan request, or an exchange request, and when the request will expire if not met, etc. The request can also include instructions on how the requested amount of the first currency should be delivered. For example, the request can instruct the exchange platform 120 to deliver the requested amount of foreign currency to the digital wallet (e.g., payment instruments stored in the digital wallet). The mobile wallet client 137 can be configured to automatically update the currency of the wallet to that of the user's current country. Alternatively or additionally, the request can instruct the exchange platform 120 to deliver the requested amount of first currency to a financial account that can be accessed at an ATM for the user to retrieve. The user can configure and send the request through a user interface provided by the currency exchange client 136 on the user device 130.

The request is matched with the exchange funds in the social pool at 206 by the exchange platform 120. In particular, the exchange platform 120 matches the request with one or more exchange accounts associated with one or more other users that include the requested first currency in the social pool. The matching method will be discussed in more detail below with reference to FIG. 3.

If a match for the request is identified at 206, at least a portion of the requested amount of foreign currency is delivered at 208 to the requester by the exchange platform 120. In arrangements where no match is identified, the exchange platform 120 notifies the requester of no match. The description of the method 200 continues under the assumption that a match is identified at 206. As discussed above, when the exchange account is created, the user associates the exchange account with a mobile wallet (e.g., payment instrument(s) stored in the mobile wallet) and/or a financial account accessible at an ATM. When requesting the foreign currency, the user can instruct the exchange platform 120 to deliver the requested currency to the digital wallet and/or the ATM-accessible account. The exchange platform 120 delivers the requested currency as specified in the request. When the foreign currency is delivered to the mobile wallet, the user can engage in a foreign currency transaction with a foreign merchant by activating the mobile wallet client 137 on the user device 130 which sends foreign currency payment instrument information from the user device 130 to a POS device maintained by the foreign merchant. In some arrangements, the user device 130 is structured to automatically activate the foreign currency payment instrument based at least in part on the location of the user device 130. For example, the user device 130 includes a positioning system device (e.g., GPS, compass, etc.) structured to determine the location of the device. When the foreign currency is delivered to the ATM accessible account, the use can withdraw the foreign currency at the ATM with, for example, a card associated with the account. In particular, the user enters the desired withdrawal amount and if the transaction is approved, receives the desired amount. The withdrawal amount is deducted from the user's account. The card may be issued by an operator of the exchange platform 120, the financial institution operating the financial institution computing system 140, or another entity. The card stores information associated with the prepaid account, e.g., account numbers, transaction histories, personal identification numbers (PINs) and/or card verification values (CVVs), the type and amount of currencies held in the account, etc.

Figure 3:
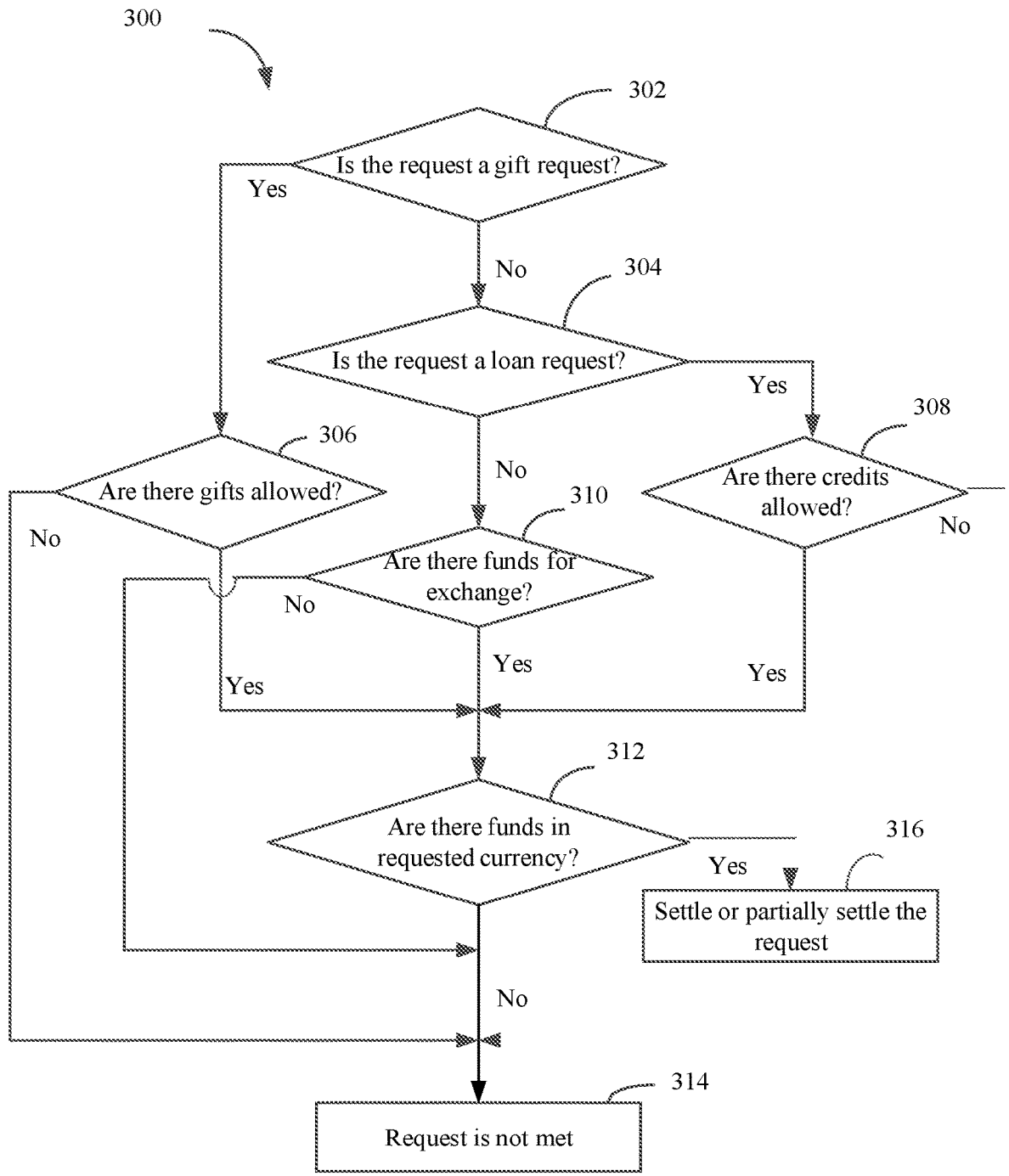
FIG. 3 is a flow diagram of a method of matching a request for an amount of foreign currency with exchange funds within a social pool according to an example embodiment.

Referring to FIG. 3, a flow diagram of a method 300 of matching the requested amount of foreign currency with funds in the social pool is shown according to an example embodiment. The method 300 is performed by the request matching circuit 124 of the exchange platform 120. In some arrangements, the method 300 is performed at 206 of the method 200. In such arrangements, the method 300 is a sub-process of the method 200.

The method 300 begins when it is determined whether the foreign currency request is a request for a gift at 302 by the request matching circuit 124. As discussed above with respect to method 200, the requester can ask for a gift in a given currency without contributing funds to the exchange platform (e.g., a gift from family and friends for an upcoming trip). The requester specifies that the request is for a gift, for example, by selecting the option of "Gift" on a web page displayed on the user device 130 that prompts the requester to select from the options of "Gift," "Loan," and "Exchange."

If at 302 it is determined that the request is for a gift, then it is determined whether there are gifts allowed for the requester in the social pool at 306. Users can set rules regarding to whom the exchange platform 120 is authorized to make a gift from the exchange accounts and how much the gift can be. The rules for people of different associations can be different. For example, a user provides that a gift up to $200 in any twelve month cycle can be made to a sibling and a gift up to $50 can be made to a cousin. To meet the requested gift, the request matching circuit 124 can pool funds from various users who allow gifts to be made to the requester. For example, the requester asks for 100 Euros as a gift. User A is the requester's sister who allows a gift up to 75 Euros to the requester and user B is the requester's good friend who allows a gift up to 25 Euros to the requester. The request matching circuit 124 pools the gift allowance from A and B to meet the requested gift of 100 Euros.

If at 306 it is determined that there are no gifts allowed for the requester in the social pool, the request is decided not to be met at 314 by the request matching circuit 124. The exchange platform 120 can send the requester a message saying "Request is not met." In some arrangements, the requester specifies an expiration date for the request (e.g., two days). Before the request expires, the request matching circuit 124 runs the operations described herein repeatedly (e.g., every five minutes, every hour) until the request is met.

If at 306 it is determined that there are gifts allowed for the requester in the social pool to meet or partially meet the requested gift, it is determined whether there are funds in the requested currency in the social pool at 312. For example, if the requester asks for a gift of 100 Euros but there are only gifts of 50 Euros in the social pool, the method 300 still proceeds to 312 because the request can be partially met. It is possible that although there are gifts allowed for the requester in the social pool, there are no funds for the gift. For example, although the requester's sister allows a gift of 75 Euros to the requester, currently, there are no Euros in the sister's exchange account.

If at 312 it is determined that there are no funds in the requested currency in the social pool to meet or partially meet the requested gift, the request is decided not to be met at 314 by the request matching circuit 124. The exchange platform 120 can send the requester a message saying "Request is not met." In some arrangements, the requester specifies an expiration date for the request (e.g., two days). Before the request expires, the request matching circuit 124 runs the operations described herein repeatedly (e.g., every five minutes, every hour) until the request is met.

If at 312 it is determined that there are funds in the requested currency in the social pool to meet or partially meet the requested gift, then the request is met or partially met and payment is settled at 316 by the exchange account management circuit 124. In settling the payment, the exchange account management circuit 122 subtracts an amount of the requested currency that is available to meet the request (i.e., at least a portion of the requested amount) from the provider(s)' exchange account(s), and transfers it to the requester's exchange account for delivery to the requester's mobile wallet or ATM-accessible account as discussed above.

If at 302 it is determined that the request is not for a gift (e.g., the option of "Loan" or "Exchange" is selected), then it is determined whether the request is for a loan at 304 by the request matching circuit 124. The requester can ask for a loan when there is not enough money in his/her exchange account to fund the requested amount of desired currency. The requester specifies that the request is for a loan, for example, by selecting the option of "Loan" on a web page displayed on the user device 130 that prompts the requester to select from the options of "Gift," "Loan," and "exchange."

If at 304 it is determined that the request is for a loan, then it is determined whether there are credits allowed for the requester in the social pool at 308. Users set rules regarding to whom the exchange platform 120 is authorized to extend credit from the exchange accounts and what the credit line is. The rules for people of different associations can be different. For example, a user sets a credit line of $1,000 for a sibling, a credit line of $200 for a cousin, a credit line of $100 to a good friend, a maximum of $25 loan for each request, and so on. To meet the requested amount of loan, the request matching circuit 124 can pool funds from various pool participants who extend credits to the requester. For example, the requester asks for a loan of 600 Euros. User A is the requester's sister who extends a credit line of 500 Euros to the requester and user B is the requester's cousin who extends a credit line of 200 Euros to the requester. The request matching circuit 124 pools the credit lines from A and B to meet the requested loan of 600 Euros. In some arrangements, the exchange platform 120 provides terms regarding loans conducted through the platform, for example, when to payback, interest rate, etc. In other arrangements, the requester and the provider can reach an agreement between themselves regarding the terms regarding the loan.

If at 308 it is determined that there are no credits allowed for the requester in the social pool, the request is decided not to be met at 314 by the request matching circuit 124. The exchange platform 120 can send the requester a message saying "Request is not met." In some arrangements, the requester specifies an expiration date for the request (e.g., two days). Before the request expires, the request matching circuit 124 runs the operations described herein repeatedly (e.g., every five minutes, every hour) until the request is met.

If at 308 it is determined that there are credits allowed for the requester in the social pool to meet or partially meet the requested loan, it is determined whether there are funds in the requested currency in the social pool at 312. For example, if the requester asks for a loan of 500 Euros but there are only credits of 300 Euros in the social pool, the method still proceeds to 312 because the request can be partially met. It is possible that although there are credits allowed for the requester in the social pool, there are no funds for the loan. For example, although the requester's sister extends a credit line of 500 Euros to the requester, currently, there are no Euros in the sister's exchange account. Therefore, although the credits are allowed, there are no funds for the loan.

If at 312 it is determined that there are no funds in the requested currency in the social pool to meet the requested loan, the request is decided not to be met at 314 by the request matching circuit 124. The exchange platform 120 can send the requester a message saying "Request is not met." In some arrangements, the requester specifies an expiration date for the request (e.g., two days). Before the request expires, the request matching circuit 124 runs the operations described herein repeatedly (e.g., every five minutes, every hour) until the request is met.

If at 312 it is determined there are funds in the requested currency in the social pool to meet or partially meet the requested loan, then the request is met or partially met and payment is settled at 316 by the exchange account management circuit 124. In settling the payment, the exchange account management circuit 122 subtracts an amount of the requested currency that is available to meet the request (i.e., at least a portion of the requested amount) from the provider(s)' exchange account(s), and transfers it to the requester's exchange account for delivery to the requester's mobile wallet or ATM-accessible account as discussed above. When later the requester pays back the loan from the exchange account in the home currency, the exchange account management circuit 122 subtracts the amount of a same or a different currency needed to pay back the loan from the requester's exchange account and transfers it to the provider(s)' account(s). If the requester pays back the loan with a different currency, the amount needed includes the amount of the different currency corresponding to the loan in the requested currency at the exchange rate (e.g., mid-price) plus the commission to the exchange platform operator. In some arrangements, the request matching circuit 124 sets the exchange rate between the ongoing bid and ask prices (e.g., mid-price) for the exchange thereby avoiding the bid-ask spread. For example, if the ongoing bid-ask price is EUR 1=USD 1.20/USD 1.10, the request matching circuit 124 uses EUR 1=USD 1.15 as the exchange rate. In further embodiments, the request matching circuit 124 adds a commission for providing the service, the commission can be a percentage of the transaction or a basis point above the mid-price. In further embodiments, the request matching circuit 124 adds an interest for the loan—the interest rate may be provided by the exchange platform 120 or be agreed upon between the requester and the provider(s).

If at 304 it is determined that the request is not for a loan (e.g., the option of "exchange" is selected), then it is determined whether there are funds in the requester's exchange account to exchange for the requested currency at 310 by the request matching circuit 124. The funds can be in more than one currencies.

If at 310 it is determined that there are no funds in the request's exchange account to fund the requested exchange, the request is decided not to be met at 314 by the request matching circuit 124. The exchange platform 120 can send the requester a message saying "Request is not met." In some arrangements, the requester specifies an expiration date for the request (e.g., two days). Before the request expires, the request matching circuit 124 runs the operations described herein repeatedly (e.g., every five minutes, every hour) until the request is met.

If at 310 it is determined that there funds in the requester's exchange account to meet or partially meet the requested exchange, then it is determined whether there are funds in the requested currency in the social pool at 312. To meet the requested amount, the request matching circuit 124 can pool funds from various pool participants who have the desired currency. For example, the requester asks for 200 Euros. Participant A has 150 Euros available and participant B has 100 Euros available. The request matching circuit 124 pools the Euros from A and B to meet the requested 200 Euros.

If at 312 it is determined that there are no funds in the requested currency in the social pool to meet the requested exchange, the request is decided not to be met at 314 by the request matching circuit 124. The exchange platform 120 can send the requester a message saying "Request is not met." In some arrangements, the requester specifies an expiration date for the request (e.g., two days). Before the request expires, the request matching circuit 124 runs the operations described herein repeatedly (e.g., every five minutes, every hour) until the request is met.

If at 312 it is determined that there are funds in the requested currency in the social pool to meet or partially meet the requested exchange, then the request is met or partially met and payment is settled at 314 by exchange account management circuit 124. In settling the payment, the exchange account management circuit 122 subtracts an amount of the requested currency that is available to meet the request (i.e., at least a portion of the requested amount) from the provider(s)' exchange account(s), and transfers it to the requester's exchange account for delivery to the requester's mobile wallet or ATM-accessible account as discussed above. The exchange account management circuit 122 also subtracts an amount of a different currency held in the requester's exchange account needed for the exchange from the requester's exchange account. The amount needed for the exchange includes the amount of the different currency corresponding to the transferred amount of the requested currency at the exchange rate (e.g., mid-price) plus the commission to the exchange platform operator. In some arrangements, the request matching circuit 124 sets the exchange rate between the ongoing bid and ask prices (e.g., mid-price) for the exchange thereby avoiding the bid-ask spread. For example, if the request is exchanging dollars for Euros and the ongoing bid-ask price is EUR 1=USD 1.20/USD 1.10, the request matching circuit 124 uses EUR 1=USD 1.15 as the exchange rate. In further embodiments, the request matching circuit 124 adds a commission for providing the service, the commission can be a percentage of the transaction or a basis point above the mid-price.

In some arrangements, the exchange account management circuit 124 maintains a ledger that tracks all transactions associated with the social pool. For example, FIGS. 4 and 5 show an example account statement associated with transactions within a social pool for a user. At May 10, 2015, the user John Doe funds his exchange account held by the exchange platform 120 with 500 dollars transferred from other funds (e.g., a check account or savings account with a financial institution). At May 12, the user requested exchange for 400 Euros when he was in Europe. The request was met and settled, and 400 Euros were delivered (e.g., transferred to a payment instrument associated with the mobile wallet or a ATM-accessible account). At May 14, the user needed more Euros—he requested a gift of 100 Euros and a loan of 200 Euros. His sister granted a gift of 100 Euros and lent 200 Euros to him. The 300 Euros were delivered to him. At June 1, the user funded his exchange account with 500 dollars and paid back his loan (i.e., 240 dollars) from his sister. At June 15 when his sister requested a gift of 100 dollars when she was in the U.S., the user made a gift of 100 dollars to her. It shall be noted that the illustrated account statement is for illustration only. The ledger can have various formats.

Various advantages can be achieved by the systems and methods disclosed herein. For example, a less expensive mechanism for foreign currency exchange is provided by avoiding the foreign exchange spread. In addition, the currency exchanges and transactions are conducted through a transparent social pool and the requested currency can be delivered by using non-traditional deliver methods (e.g., mobile wallet, ATM), thereby achieving fast transactions.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the embodiments might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A method comprising:
receiving, by a currency exchange platform, a request for a first amount of a currency from a first user in a social pool, the request comprising an indication of a type of the request and a preference for delivery of the currency;
matching, by the currency exchange platform, the request with a matching account in the social pool, the matching account having one or more rules set by a second user that allow transfers of differing limits of the currency to users based on types of relationships the users have with the second user, wherein the request is matched with the matching account based on the first amount being less than or equal to a limit associated with a type of relationship the first user has with the second user;
associating, by the currency exchange platform, an exchange account of the first user with a payment instrument stored in a mobile wallet and an account accessible at an automated teller machine (ATM), in response to creating the exchange account;
activating the payment instrument stored in the mobile wallet based on a location of a user device of the first user;
responsive to the preference for delivery indicating the ATM dispensing the currency, dispensing, by the currency exchange platform via the ATM, at least a portion of the requested first amount of the currency from funds of the matching account to the first user; and
updating, by the currency exchange platform, a ledger that tracks the requested amount and the request type for transactions conducted in the social pool.

2. The method of claim 1, wherein the matching account is a first matching account, and the method further comprises:
matching, by the currency exchange platform, the request with a second matching account in the social pool, wherein the first matching account and the second matching account each individually have insufficient funds to meet the requested amount of the currency.

3. The method of claim 1, wherein the delivering at least a portion of the requested first amount of the currency includes transferring the at least a portion of the requested first amount of the currency to a payment instrument associated with a mobile wallet of the first user.

4. The method of claim 1, wherein the social pool further comprises a plurality of users associated with each other through a social network, the social network comprising a computer network connecting the plurality of users, and being defined separately from the currency exchange platform.

5. A currency exchange platform comprising:
an exchange account database having a plurality of exchange accounts associated with a plurality users of a social pool, wherein the plurality of users are associated with each other through a social network, the social network is a computer network connecting the plurality of users, the social network being defined separately from the currency exchange platform;
a network interface configured to communicate data to and from at least one of a financial institution computing system, the social network, a user device associated with a user, and an ATM system over a network;
memory; and
a processor structured to:
receive a request for a first amount of a currency from a first user in a social pool, the request comprising an indication of a type of the request and a preference for delivery of the currency;
match the request with a matching account having one or more rules set by a second user that allow transfers of differing limits of the currency to users based on types of relationships the users have with the second user, wherein the request is matched with the matching account based on the first amount being less than or equal to a limit associated with a type of relationship the first user has with the second user;
associate an exchange account of the first user with a payment instrument stored in a mobile wallet and an account accessible at an automated teller machine (ATM), in response to creating the exchange account;
activate the payment instrument stored in the mobile wallet based on a location of a user device of the first user;
responsive to the preference for delivery indicating the ATM dispensing the currency, dispense, via the ATM, at least a portion of the requested first amount of the currency from funds of the matching account to the first user; and
update a ledger that tracks the requested amount and the request type for transactions conducted in the social pool.

6. The platform of claim 5, wherein the matching account is a first matching account, and the processor is further structured to:
match the request with a second matching account in the social pool, wherein the first matching account and the second matching account each individually have insufficient funds to meet the requested amount of the currency.

7. The platform of claim 5, wherein the processor is further configured to transfer the at least a portion of the requested amount of the currency to a payment instrument associated with a mobile wallet of the first user.

8. The platform of claim 5, wherein the social pool further comprises a plurality of users associated with each other through a social network, the social network comprising a computer network connecting the plurality of users, and being defined separately from the currency exchange platform.

9. A non-transitory computer-readable media having computer-executable instructions embodied therein, when executed by a processor of a social foreign currency exchange platform, cause the social foreign currency exchange platform to perform a process, the process including:
setting up exchange funds in a plurality of exchange accounts associated with a plurality of users of a social pool, wherein the plurality of users are associated with each other through a social network, the social network is a computer network connecting the plurality of users, the social network being defined separately from the currency exchange platform;

receiving a request for a first amount of a currency from a first user in a social pool, the request comprising an indication of a type of the request and a preference for delivery of the currency;

matching the request with a matching account in the social pool, the matching account having one or more rules set by a second user that allow transfers of differing limits of the currency to users based on types of relationships the users have with the second user, wherein the request is matched with the matching account based on the first amount being less than or equal to a limit associated with a type of relationship the first user has with the second user;

associating an exchange account of the first user with a payment instrument stored in a mobile wallet and an account accessible at an automated teller machine (ATM), in response to creating the exchange account;

activating the payment instrument stored in the mobile wallet based on a location of a user device of the first user;

responsive to the preference for delivery indicating the ATM dispensing the currency, dispensing, via the ATM, at least a portion of the requested first amount of the currency from funds of the matching account to the first user; and updating a ledger that tracks the requested amount and the request type for transactions conducted in the social pool.

10. The media of claim 9, wherein the matching account is a first matching account, and the process further includes:

matching the request with a second matching account in the social pool, wherein the first matching account and the second matching account each individually have insufficient funds to meet the requested amount of the currency.

11. The media of claim 9, wherein the delivering at least a portion of the requested amount of the currency includes transferring the at least a portion of the requested amount of the first currency to a payment instrument associated with a mobile wallet of the first user.

12. The media of claim 9, wherein the social pool further comprises a plurality of users associated with each other through a social network, the social network comprising a computer network connecting the plurality of users, and being defined separately from the currency exchange platform.

\* \* \* \* \*